United States Patent
Hou et al.

(10) Patent No.: US 12,118,054 B2
(45) Date of Patent: Oct. 15, 2024

(54) METHOD, SERVER, AND SYSTEM FOR IMAGE DEPLOYMENT

(71) Applicant: Dell Products L.P., Round Rock, TX (US)

(72) Inventors: Anzhou Hou, Shanghai (CN); Zhenzhen Lin, Shanghai (CN); Si Chen, Shanghai (CN); Yuhong Nie, Shanghai (CN); Chenxi Hu, Beijing (CN)

(73) Assignee: Dell Products L.P., Round Rock, TX (US)

( * ) Notice: Subject to any disclaimer, the term of this patent is extended or adjusted under 35 U.S.C. 154(b) by 191 days.

(21) Appl. No.: 17/860,764

(22) Filed: Jul. 8, 2022

(65) Prior Publication Data

US 2023/0401273 A1    Dec. 14, 2023

(30) Foreign Application Priority Data

Jun. 10, 2022  (CN) .......................... 202210658113.5

(51) Int. Cl.
   *G06F 16/18*     (2019.01)
   *G06F 16/957*    (2019.01)
   *G06F 16/958*    (2019.01)
   *G06N 7/01*      (2023.01)

(52) U.S. Cl.
   CPC ........ *G06F 16/9574* (2019.01); *G06F 16/958* (2019.01); *G06N 7/01* (2023.01)

(58) Field of Classification Search
   CPC ..... G06F 8/60; G06F 8/63; G06F 8/65; G06F 16/1834
   See application file for complete search history.

(56) References Cited

U.S. PATENT DOCUMENTS

| | | | |
|---|---|---|---|
| 2010/0183017 A1* | 7/2010 | Mori | H04L 67/1001 370/400 |
| 2018/0349150 A1* | 12/2018 | Wong | G06F 9/4493 |
| 2018/0373517 A1* | 12/2018 | Hu | H04L 67/34 |

OTHER PUBLICATIONS

Github, "Dragonfly," https://github.com/dragonflyoss/Dragonfly2, Accessed Apr. 20, 2022, 5 pages.

(Continued)

*Primary Examiner* — Duy Khuong T Nguyen
(74) *Attorney, Agent, or Firm* — Ryan, Mason & Lewis, LLP

(57) ABSTRACT

A method includes: receiving, by a repository server, requests for pulling images from a plurality of nodes, wherein an image requested to be pulled by a first node is a first image; detecting, by the repository server, that layers of a plurality of images requested to be pulled by the plurality of nodes all include a common layer; generating, by the repository server, a transmission path of data of the common layer, wherein the transmission path includes that the repository server transmits the data of the common layer to a second node, and the second node distributes the data of the common layer to other nodes; sending, by the repository server, setting information to the first node according to the transmission path; sending, by the repository server, the data of the common layer to the second node; and acquiring, by the first node, the data of the common layer from a third node according to the setting information.

20 Claims, 9 Drawing Sheets

(56) References Cited

OTHER PUBLICATIONS

Github, "Kraken," https://github.com/uber/kraken, Accessed Apr. 20, 2022, 8 pages.
G. Scrivano et al., "Pull Container Images Faster with Partial Pulls," https://www.redhat.com/sysadmin/faster-container-image-pulls, Nov. 12, 2021, 8 pages.
S. Das et al., "Deduplication of Docker Image Registry," 2021 IEEE Madras Section Conference, Aug. 27-28, 2021, 8 pages.

* cited by examiner

METHOD, SERVER, AND SYSTEM FOR IMAGE DEPLOYMENT

RELATED APPLICATION(S)

The present application claims priority to Chinese Patent Application No. 202210658113.5, filed Jun. 10, 2022, and entitled "Method, Server, and System for Image Deployment," which is incorporated by reference herein in its entirety.

FIELD

Embodiments of the present disclosure relate to the field of computer technologies, and more particularly, to a method, server, and system for image deployment.

BACKGROUND

Docker is an open-source application container engine for automated deployment of applications. It can allow developers to package applications and dependent packages into containers, and can allow several containers to run on a host or virtual machine, each container being an independent virtual environment or application.

In an edge application scenario, containers run by edge nodes (also referred to as edge end nodes) come from images, and images may be self-made by users or submitted by running containers. After images are generated, they may be pushed to a docker registry in a cloud for storage, and edge nodes may also pull required images from the docker repository to local nodes to run containers.

SUMMARY

According to example embodiments of the present disclosure, an image deployment solution is provided, which is used to solve the problems of large network transmission overhead and long total deployment time during docker image deployment.

In a first aspect of the present disclosure, a method for image deployment applied to a docker system is provided, where the docker system includes a repository server and a plurality of nodes, and the method may include: receiving, by the repository server, requests for pulling images from the plurality of nodes, wherein an image requested to be pulled by a first node is a first image; detecting, by the repository server, that layers of a plurality of images requested to be pulled by the plurality of nodes all include a common layer; generating, by the repository server, a transmission path of data of the common layer, wherein the transmission path includes that the repository server transmits the data of the common layer to a second node, the second node being an initial node selected by the repository server in the plurality of nodes for distributing the data of the common layer acquired from the repository server to other nodes; sending, by the repository server, setting information to the first node according to the transmission path, wherein the setting information includes instructing the first node to acquire the data of the common layer from a third node; sending, by the repository server, the data of the common layer to the second node; and acquiring, by the first node, the data of the common layer from the third node according to the setting information.

The method provided in the first aspect is implemented such that the same image layer only needs to be transmitted from a cloud to an edge end once, which avoids repeated pulling of the same image layer from a repository server by different edge nodes, thereby reducing the network transmission overhead, improving the efficiency of docker image downloading, transmission, and deployment, and shortening the total image deployment time.

In some embodiments, the method may further include: sending, by the repository server in response to a request of the first node for pulling remaining layers from the repository server, data of the remaining layers to the first node, wherein the remaining layers are layers other than the common layer in the first image.

In some embodiments, the method may further include: generating, by the repository server, a layer list of the first image according to layers included in the first image, wherein the layer list includes the common layer; and sending, by the repository server, the layer list of the first image to the first node.

In some embodiments, the layer list further includes the remaining layers, and the method may further include: sending, after acquisition of the data of the common layer is completed, a request for pulling the remaining layers to the repository server by the first node according to the remaining layers indicated in the layer list.

In some embodiments, the method may further include: sending, by the first node and according to deployment parameters sent by a fourth node, the request for pulling the first image to the repository server, wherein the deployment parameters include a parameter identifying a to-be-deployed image of the first node as the first image, and the fourth node is configured to arrange to-be-deployed images of the plurality of nodes.

In some embodiments, the transmission path is a directed acyclic graph.

In some embodiments, the method may further include: dividing, by the repository server, the common layer into a plurality of data blocks, each data block in the plurality of data blocks corresponding to a hash value, wherein the setting information sent to the first node by the repository server further includes hash values corresponding to the plurality of data blocks.

In some embodiments, the first node may request for acquiring the plurality of data blocks constituting the common layer from the third node according to the hash values corresponding to the plurality of data blocks.

In a second aspect of the present disclosure, a method for image deployment applied to a server is provided, and the method may include: receiving requests for pulling images from a plurality of nodes, wherein an image requested to be pulled by a first node is a first image; detecting that layers of a plurality of images requested to be pulled by the plurality of nodes all include a common layer; generating a transmission path of data of the common layer, wherein the transmission path includes transmitting the data of the common layer to a second node, the second node being an initial node selected in the plurality of nodes for distributing the data of the common layer to other nodes; sending setting information to the first node according to the transmission path, wherein the setting information includes instructing the first node to acquire the data of the common layer from a third node; and sending the data of the common layer to the second node, wherein the first node acquires the data of the common layer from the third node according to the setting information.

The method provided in the second aspect is implemented such that the same image layer only needs to be transmitted from a cloud to an edge end once, which avoids repeated pulling of the same image layer from a repository server by different edge nodes, thereby reducing the network transmission overhead, improving the efficiency of docker image downloading, transmission, and deployment, and shortening the total image deployment time.

In some embodiments, the method may further include: sending, in response to a request of the first node for pulling remaining layers, data of the remaining layers to the first node, wherein the remaining layers are layers other than the common layer in the first image.

In some embodiments, the method may further include: generating a layer list of the first image according to layers included in the first image, wherein the layer list includes the common layer; and sending the layer list of the first image to the first node.

In some embodiments, the layer list further includes the remaining layers, and the method may further include: receiving, after acquisition of the data of the common layer is completed, a request for pulling the remaining layers generated by the first node according to the remaining layers indicated in the layer list.

In some embodiments, the received request of the first node for pulling the first image is generated according to deployment parameters sent by a fourth node, the deployment parameters comprise a parameter identifying a to-be-deployed image of the first node as the first image, and the fourth node is configured to arrange to-be-deployed images of the plurality of nodes.

In some embodiments, the transmission path is a directed acyclic graph.

In some embodiments, the method may further include: dividing the common layer into a plurality of data blocks, each data block in the plurality of data blocks corresponding to a hash value. The setting information sent to the first node further includes hash values corresponding to the plurality of data blocks.

In some embodiments, the method may further include: acquiring, by the first node, the plurality of data blocks constituting the common layer from the third node according to the hash values corresponding to the plurality of data blocks.

In a third aspect of the present disclosure, a server for image deployment is provided. The server includes: a processor and a memory coupled to the processor, wherein the memory has instructions stored therein, and the instructions, when executed by the processor, cause the server to perform actions including: receiving requests for pulling images from a plurality of nodes, wherein an image requested to be pulled by a first node is a first image; detecting that layers of a plurality of images requested to be pulled by the plurality of nodes all include a common layer; generating a transmission path of data of the common layer, wherein the transmission path includes transmitting the data of the common layer to a second node, the second node being an initial node selected in the plurality of nodes for distributing the data of the common layer to other nodes; sending setting information to the first node according to the transmission path, wherein the setting information includes instructing the first node to acquire the data of the common layer from a third node; and sending the data of the common layer to the second node, wherein the first node acquires the data of the common layer from the third node according to the setting information.

The server provided in the third aspect is implemented such that the same image layer only needs to be transmitted from a cloud to an edge end once, which avoids repeated pulling of the same image layer from a repository server by different edge nodes, thereby reducing the network transmission overhead, improving the efficiency of docker image downloading, transmission, and deployment, and shortening the total image deployment time.

In some embodiments, the actions further include: sending, in response to a request of the first node for pulling remaining layers, data of the remaining layers to the first node, wherein the remaining layers are layers other than the common layer in the first image.

In some embodiments, the actions further include: generating a layer list of the first image according to layers included in the first image, wherein the layer list includes the common layer; and sending the layer list of the first image to the first node.

In some embodiments, the layer list further includes the remaining layers, and the actions further include: receiving, after acquisition of the data of the common layer is completed, a request for pulling the remaining layers generated by the first node according to the remaining layers indicated in the layer list.

In some embodiments, the received request of the first node for pulling the first image is generated according to deployment parameters sent by a fourth node, the deployment parameters comprise a parameter identifying a to-be-deployed image of the first node as the first image, and the fourth node is configured to arrange to-be-deployed images of the plurality of nodes.

In some embodiments, the transmission path is a directed acyclic graph.

In some embodiments, the actions further include: dividing the common layer into a plurality of data blocks, each data block in the plurality of data blocks corresponding to a hash value. The setting information sent to the first node further includes hash values corresponding to the plurality of data blocks.

In some embodiments, the actions further include: acquiring, by the first node, the plurality of data blocks constituting the common layer from the third node according to the hash values corresponding to the plurality of data blocks.

In a fourth aspect of the present disclosure, a docker system is provided, including a repository server and a plurality of nodes, wherein the repository server may be implemented as the server in the third aspect of the present disclosure.

In a fifth aspect of the present disclosure, a computer program product is provided. The computer program product is tangibly stored on a non-transitory computer-readable medium and includes machine-executable instructions. The machine-executable instructions, when executed by a machine, cause the machine to perform the method according to at least one of the first and second aspects of the present disclosure.

In a sixth aspect of the present disclosure, a computer-readable storage medium having a computer program stored thereon is provided, wherein the computer program, when executed by a device, causes the device to perform the method according to at least one of the first and second aspects of the present disclosure.

As can be seen from the above description, with the solutions of various embodiments according to the present disclosure, the same image layer only needs to be transmitted from a cloud to an edge end once, which avoids repeated pulling of the same image layer from a repository server by different edge nodes, thereby reducing the network transmission overhead, improving the efficiency of docker image downloading, transmission, and deployment, and reducing the total image deployment time.

It should be understood that this Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

DETAILED DESCRIPTION

Figure 1:
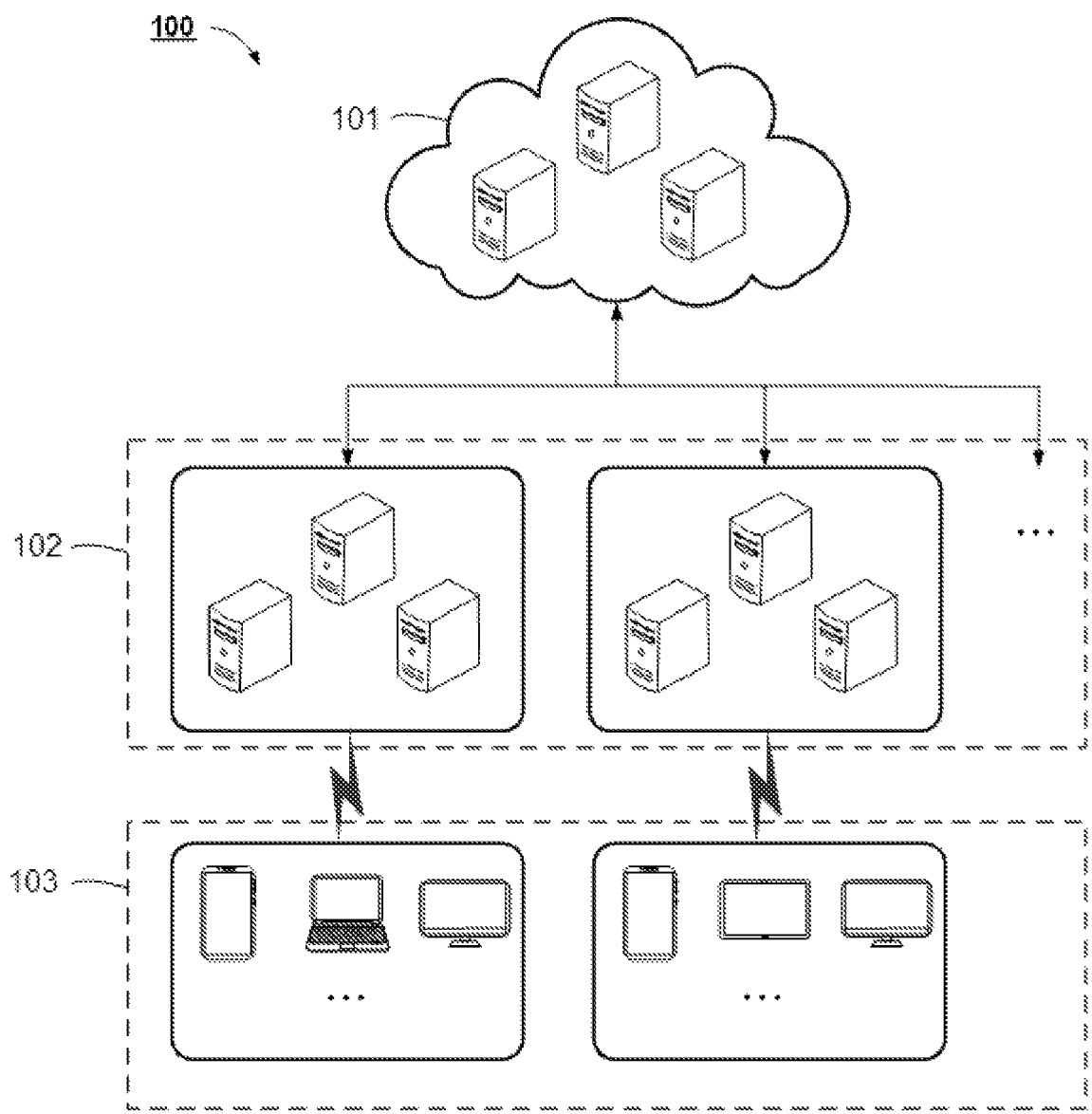
FIG. 1 is a schematic diagram of an edge scenario in which a plurality of embodiments according to the present disclosure can be implemented.

Illustrative embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Container technology is a way to virtualize operating systems, enabling resources to run applications and their dependency relationships in isolated processes. The container technology and a host machine share hardware resources and an operating system, which can realize dynamic allocation of resources. A container contains an application and all its dependent packages, but shares a kernel with other containers. Containers run as separate processes in a user space in a host operating system. Containers can virtualize an operating system layer. Compared with hardware virtualization of virtual machines, containers have the advantages of being more portable, more flexible, faster to deploy, smaller in size, and less in occupied resources.

By using containers, code, configuration, and dependency relationships of applications can be easily packaged into easy-to-use building blocks, thereby implementing various objectives such as environmental consistency, operational efficiency, developer productivity, and version control. Containers can help ensure that applications are deployed quickly, reliably, and consistently, regardless of the deployment environment. Containers give developers more fine-grained control capabilities over resources, making infrastructure more efficient.

Docker is an open-source application container engine that uses a client-server (CS) architecture for developing, shipping, and running applications, and can provide containers with stronger isolation and compatibility. Docker allows developers to separate out applications in the infrastructure, package applications and dependent packages (including system environment and configuration), form containers, and deploy to hosts or virtual machines and run several containers to achieve rapid shipping of the applications. Each container is an independent virtual environment or application, and different containers are kept independent or isolated from each other and do not affect each other.

An image is a read-only template that instructs creation of a container, and a container is a runnable instance of an image. An image is a special file system that not only provides files such as programs, libraries, resources, and configuration that are required to provide container running, but also contains some configuration parameters prepared for the running, such as anonymous volumes, environment variables, and users.

Docker images may be stored in the file system in a hierarchical storage manner, and different images may have some identical layers. Imaging is implemented based on a union file system (union FS). The union file system is a layered, lightweight, and high-performance file system, which supports the modification to the file system as a single commit to be superimposed layer by layer. At the same time, different directories can be mounted to the same virtual file system, that is, implemented based on incremental file modification, read-write layering, and partial sharing.

Docker registry is a service for centrally storing and distributing images, and may also be referred to as a docker repository server or a docker repository registration server. A Docker registry may contain a plurality of repositories. A repository is a place for centrally storing images. Each repository may contain a plurality of images with different tags. If it is intended to run a certain container, a corresponding image may be downloaded from a docker registry to a local node, and then a container is created from the image. Correspondingly, if the local node reads and writes the container to generate a new image layer, it is also needed to push the new image to the registry.

As the container is read and written, the size of the corresponding docker image becomes increasingly larger, and may even reach tens of gigabytes. In an edge scenario, when an image is downloaded and deployed from a docker registry in a cloud to an edge end node, or in a hybrid cloud scenario, when an image is deployed from a public cloud to a private cloud or from a private cloud to a public cloud, it will be transmitted through a wide area network (WAN) and a local area network (LAN). Since the transmission speed of the wide area network is usually lower than that of the local area network, the download speed of the image will be limited by the bandwidth of the WAN network. If edge end nodes need to deploy a plurality of images at the same time, pulling the images from the docker repository respectively and independently will result in a large network bandwidth overhead and a long image deployment time. Therefore, improving the efficiency of docker image downloading and deployment and shortening the deployment time are urgent problems to be solved. When the network speed is an uncontrollable variable, the method for image deployment may be optimized to improve the image deployment efficiency and shorten the image deployment time.

Since images may be stored in hierarchical storage, different images may have some identical or similar layers, especially an operating system base layer. In some embodiments, when different nodes on the same edge end respectively pull required different images from the registry, the same image layer is also pulled repeatedly, which leads to waste of network transmission bandwidth and affects the image download rate. For example, in some examples, the operating system base layer has a larger image layer size than an application layer, and therefore, the operating system base layer needs to consume more time for transmission, and repeated transmission will consume more time and network overhead. In some embodiments, a node may acquire the same layer of an image that another node on the same edge end has downloaded, for saving the network overhead. However, if the actions of different nodes pulling images are independent, after it is found through lookup that downloaded images of other nodes do not have the same layer, there is a situation where different nodes with the same layer respectively pull the image from the registry at the same time, which will cause that same image layer to be pulled repeatedly, while the various nodes are not coordinated, data transmission is confused, and other problems arise, thus wasting network resources and total image deployment time. Therefore, there is still room to improve the efficiency of image deployment.

Embodiments of the present disclosure provide a technical solution for image deployment, which is used for solving the problems of large network transmission overhead and long total image deployment time described above. The technical solution for image deployment may quickly deploy docker images in application scenarios such as edge scenarios or hybrid cloud scenarios, including adding an image coordinator and a worker coordinator to a docker repository server for coordinating distribution of images, and setting up a two-stage docker image deployment process including a pipeline stage and a non-pipeline stage. A pipeline agent (PA) and a leader node may be added at edge nodes, for assisting image data transmission of the pipeline stage. The docker repository server may obtain, through analysis, a common layer of images required by a plurality of nodes, and establish a pipeline for data transmission of the common layer. In the pipeline stage, the docker repository server sends data of the common layer to the leader node, and then the leader node distributes the data of the common layer to other nodes according to the pipeline setting; in the non-pipeline stage, each node independently pulls remaining layers of the required image from the docker repository server.

The technical solution provided by the present disclosure is implemented such that the same image layer only needs to be transmitted from a cloud to an edge end once, which avoids repeated pulling of the same image layer from a repository server by different edge nodes, thereby reducing the network transmission overhead, improving the efficiency of docker image downloading, transmission, and deployment, and shortening the total image deployment time.

Various embodiments of the present disclosure may be applied to edge scenarios. FIG. 1 is a schematic diagram of an example edge scenario 100.

As shown in FIG. 1, edge scenario 100 may include cloud computing layer 101, edge computing layer 102, terminal layer 103, and the like. Cloud computing layer 101 may include one or a plurality of cloud server clusters. Edge computing layer 102 may include one or a plurality of edge node clusters, and each edge node cluster may include one or a plurality of edge nodes. Terminal layer 103 may include a plurality of terminal devices, such as smart phones, tablet computers, notebook computers, desktop computers, smart bracelets, and smart watches. Embodiments of the present disclosure do not make any limitation to types of devices for implementation of cloud computing layer 101, edge computing layer 102, and terminal layer 103.

A communication network between edge computing layer 102 and cloud computing layer 101 may be a wide area network or a metropolitan area network. A communication network between edge nodes in the edge node cluster may be a local area network (LAN). A communication connection between the edge node cluster and the corresponding plurality of terminals may be a wireless connection such as a Bluetooth connection and a wireless local area network (WLAN) connection, or a wired connection such as a broadband connection and a universal serial bus (USB) connection. Embodiments of the present disclosure do not make any limitation to the communication connection manner between the devices in cloud computing layer 101, edge computing layer 102, and terminal layer 103.

Edge computing involved in edge scenarios is the extension of cloud computing capabilities in edge nodes in the Internet of Things. Some resources may be deployed on edge nodes, which can speed up data processing and data transmission and quickly respond to messages from local terminals, and the resources deployed on the edge nodes may run normally in an abnormal network environment.

In combination with the edge scenarios, in some embodiments, a docker repository server is located at cloud computing layer 101, and one or a plurality of images are stored in the docker repository server. A container run by an edge node comes from an image. The edge node may pull a required image from the docker repository server to a local edge node to run the container according to requirements, or the edge node may acquire a downloaded image from another edge node in the same edge node cluster.

According to the technical solution provided by the present disclosure, an image coordinator and a worker coordinator may be added to the docker repository server to coordinate the distribution of images, and a pipeline agent and a leader node may be added to the edge nodes to assist the transmission of image data of the pipeline stage. This will be described in further detail below.

It is to be understood that the above edge scenario 100 is only an example of an application scenario provided by the present disclosure, and the technical solutions provided by the present disclosure may also be applied to a hybrid cloud scenario and the like. For example, a docker repository server on a public cloud contains a plurality of images, a node on a private cloud may pull a required image from the docker repository server on the public cloud, and the image will be deployed from the public cloud to the private cloud via a network. The technical solution provided by the present disclosure may be applied in various scenarios including far-end-near-end and cross-network transmission, and the scope of the present disclosure is not limited in this respect.

Figure 2:
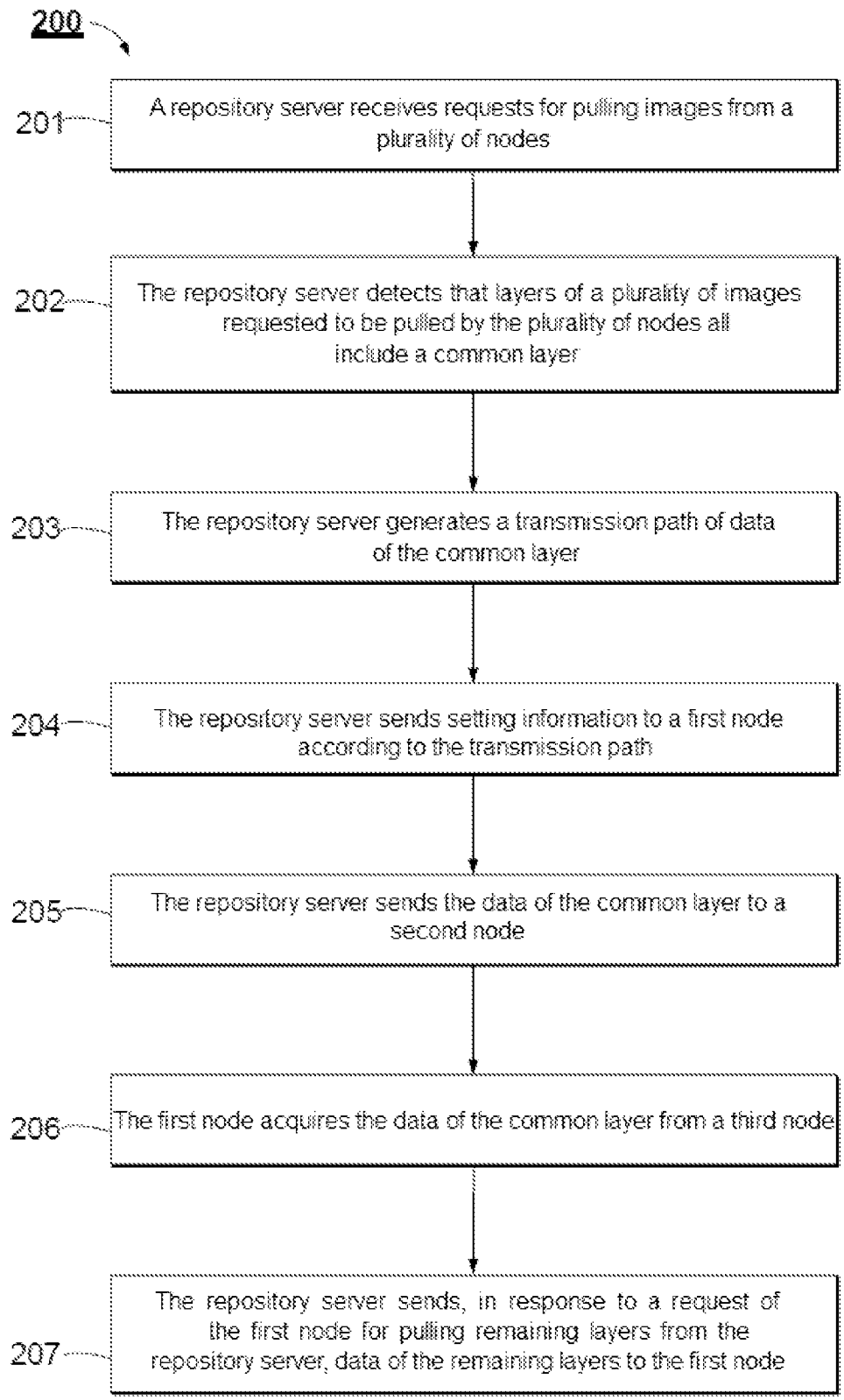
FIG. 2 is a flow chart of a method for image deployment according to some embodiments of the present disclosure.

FIG. 2 is a flow chart of a method 200 for image deployment according to some embodiments of the present disclosure. Method 200 may be applied to a docker system, and the docker system may include a repository server and a plurality of nodes. With reference to examples shown in FIG. 3A to FIG. 3E, the repository server in this embodiment may be implemented in a cloud 301 as a docker registry 302, and nodes may be implemented as edge nodes of edge end 310, such as node 311, node 312, node 313, and node 314.

It should be understood that method 200 may also include additional blocks that are not shown and/or may omit blocks that are shown, and the scope of the present disclosure is not limited in this regard. It should be understood that, in embodiments of the present disclosure, any edge node or repository server may be implemented by one entity device, such as a server, a computer, and a mobile terminal, or may be implemented jointly by a plurality of entity devices. It is to be understood that any edge node or repository server may be a logical function module in an entity device, or may be a logical function module composed of a plurality of entity devices. It should be understood that, in the following embodiments of the present disclosure, steps in a method provided in embodiments of the present disclosure may be performed by one entity device, or the steps in the method provided in embodiment of the present disclosure may be performed by a plurality of entity devices collaboratively, and embodiments of the present disclosure do not impose any limitation to this.

At block 201, the repository server receives requests for pulling images from a plurality of nodes.

An image requested to be pulled by a first node is a first image. The first node may be any node at an edge end, and in this embodiment, the first node does not specifically refer to a certain node.

In some embodiments, according to deployment parameters sent by a fourth node, the first node sends a request for pulling the first image to the repository server. In some embodiments, the fourth node is also referred to as a master node. That is, the request of the first node for pulling the first image received by the repository server is generated according to the deployment parameters sent by the master node. The deployment parameters include a parameter identifying a to-be-deployed image of the first node as the first image, and the master node is configured to arrange to-be-deployed images of the plurality of nodes.

Figure 3A:
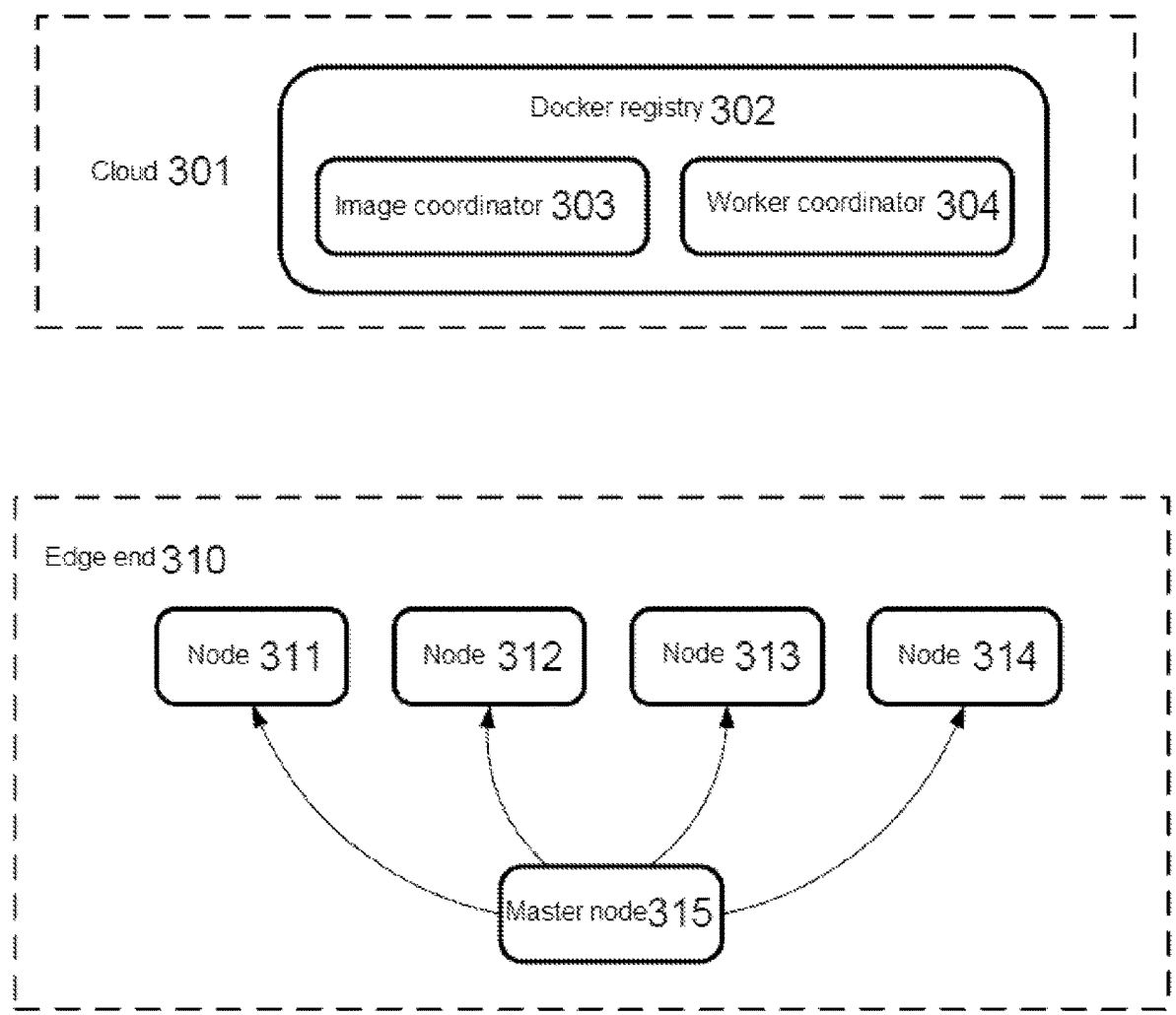
FIG. 3A is an example process of a technical solution applying image deployment according to some embodiments of the present disclosure.

With reference to the example shown in FIG. 3A, master node 315 of edge end 310 sends a parameter indicating a to-be-deployed image to each edge node. The deployment script includes parameters such as a unique batch identifier and the number of the to-be-deployed image. With reference to the example shown in FIG. 3B, each edge node sends an image pull request to image coordinator 303 of docker registry 302 of cloud 301 according to the parameter.

At block 202, the repository server detects that layers of a plurality of images requested to be pulled by the plurality of nodes all include a common layer.

The common layer is the same layer in the images required by these nodes.

In some embodiments, the repository server generates a layer list of the first image according to layers included in the first image, and the layer list includes the common layer and remaining layers.

In some embodiments, the repository server sends the layer list of the first image to the first node.

In some embodiments, the repository server divides the common layer into a plurality of data blocks, and each data block in the plurality of data blocks corresponds to a hash value.

Figure 3B:
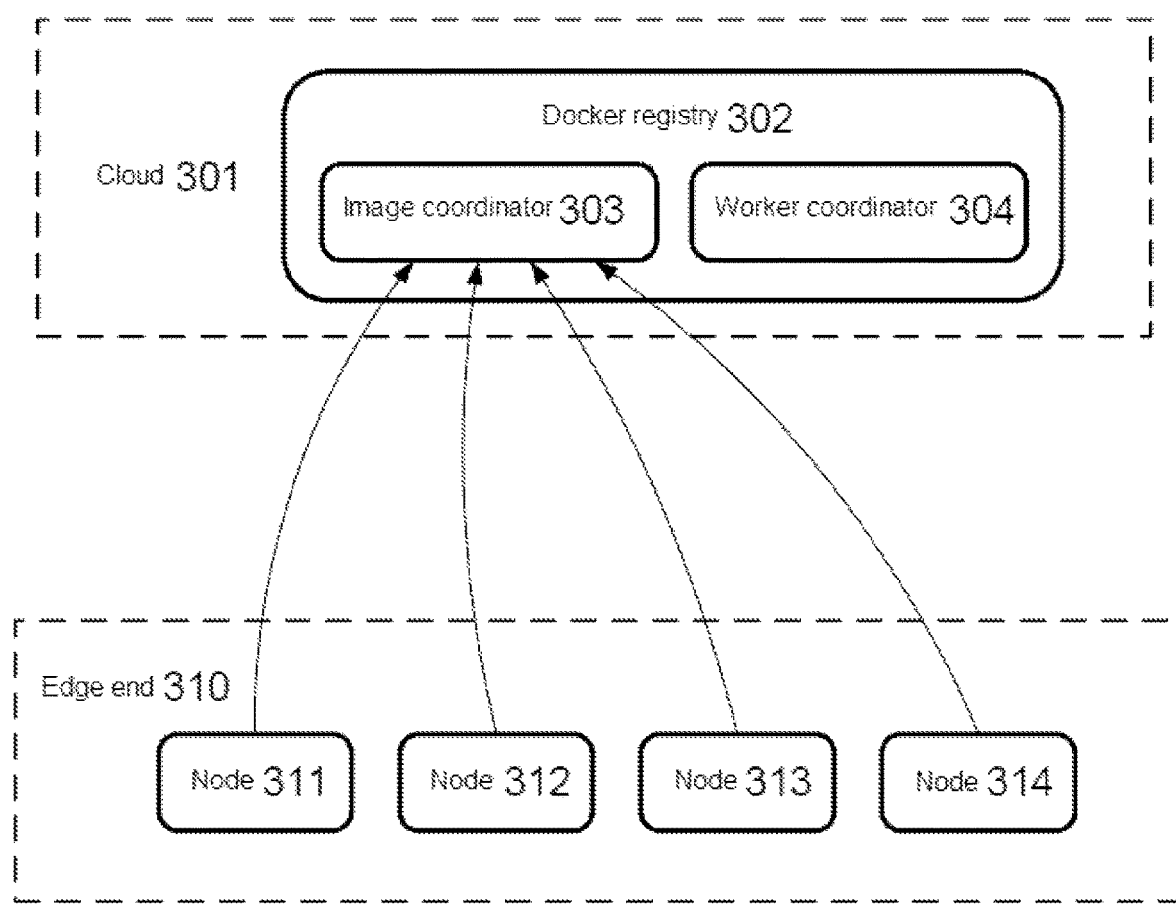
FIG. 3B is an example process of a technical solution applying image deployment according to some embodiments of the present disclosure.
Figure 3C:
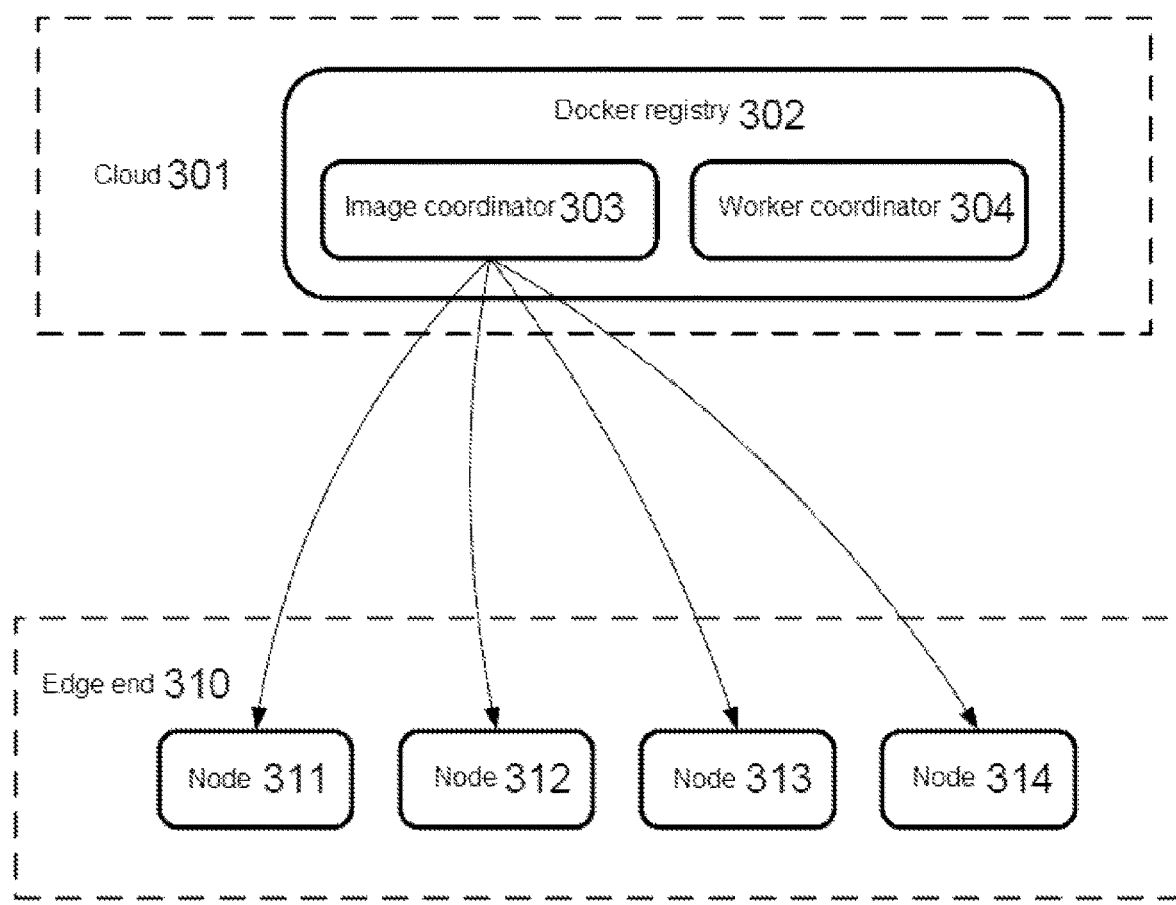
FIG. 3C is an example process of a technical solution applying image deployment according to some embodiments of the present disclosure.

With reference to the example shown in FIG. 3C, image coordinator 303 of docker registry 302 may send a layer list corresponding to the generated image and a list (e.g., hash values) of data blocks of the common layer to each edge node.

At block 203, the repository server generates a transmission path of data of the common layer.

In some embodiments of the present disclosure, the transmission path may also be referred to as a pipeline.

In some embodiments, the transmission path includes transmitting, by the repository server, the data of the common layer to a second node, the second node being an initial node selected by the repository server among the plurality of nodes at the edge end for distributing the data of the common layer acquired from the repository server to other nodes. In some embodiments of the present disclosure, the second node may also be referred to as a leader node. The second node may be the first node, and the second node may not be the first node, which is not limited in this embodiment. With reference to the example shown in FIG. 3D, in the pipeline stage, worker coordinator 304 of docker registry 302 selects node 314 as the leader node randomly or according to a preset policy.

In some embodiments, the transmission path is a directed acyclic graph. With reference to the example shown in FIG. 3D, the set pipeline for transmitting common layer X1 of the image is: docker registry 302→node 314→node 313→node 312/node 311.

This embodiment does not impose any limitation as to how to select the leader node, the strategy, method, and requirements for setting the pipeline, and the representation of the pipeline.

At block 204, the repository server sends setting information to the first node according to the transmission path.

In some embodiments, the setting information includes data instructing the first node to acquire the common layer from a third node. In some embodiments of the present disclosure, the third node may also be referred to as an upstream node of the first node. The upstream node of a node refers to the previous node from which the node directly acquires the data of the common layer in a data transmission pipeline of the common layer. A node may acquire data blocks of the common layer from its upstream node, and may also send the data blocks of the common layer to its downstream node. The upstream node and downstream node of a node expressed here are for the convenience of describing data transmission nodes directly associated with the node in the pipeline, and are not intended to limit the present disclosure. A node may have one or a plurality of upstream nodes, and may also have one or a plurality of downstream nodes, which is not limited in embodiments of the present disclosure.

In some embodiments, the setting information sent by the repository server to the first node further includes hash values corresponding to the plurality of data blocks.

Figure 3D:
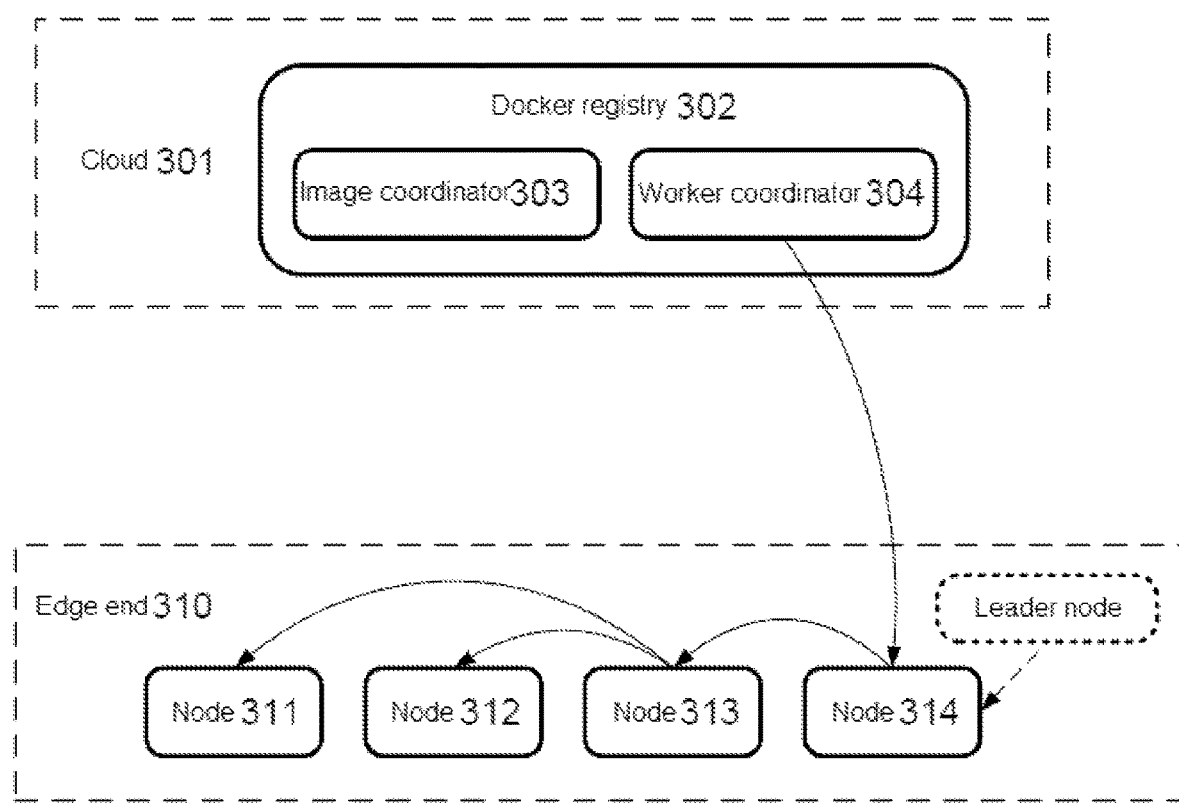
FIG. 3D is an example process of a technical solution applying image deployment according to some embodiments of the present disclosure.

With reference to the example shown in FIG. 3D, worker coordinator 304 of docker registry 302 sends relevant setting information of the pipeline to each edge node, and the setting information may include an upstream node and/or a downstream node corresponding to each edge node, a layer list of the image, hash values of data blocks of the same layer, and the like.

At block 205, the repository server sends the data of the common layer to the second node.

With reference to the example shown in FIG. 3D, in the pipeline stage, worker coordinator 304 of docker registry 302 sends the data of common layer X1 to node 314.

At block 206, the first node acquires the data of the common layer from the third node according to the setting information.

That is, the data of the common layer is transmitted to the first node via the upstream node of the first node according to the setting information.

In some embodiments, the first node requests, according to the hash values corresponding to the plurality of data blocks, for acquiring the plurality of data blocks constituting the common layer from the third node. Then, in response to the request for pulling the data blocks, the third node sends the plurality of data blocks constituting the common layer to the first node. The first node acquires the plurality of data blocks constituting the common layer from the third node. That is, in response to a request generated by the first node for acquiring the plurality of data blocks from the upstream node of the first node according to the hash values corresponding to the plurality of data blocks, the plurality of data blocks constituting the common layer are transmitted to the first node through the upstream node of the first node. With reference to the example shown in FIG. 3D, after each node receives corresponding setting information, a pipeline agent transmits data blocks of the same image layer in parallel according to the setting information of the pipeline until the transmission is completed.

At block 207, in response to a request of the first node for pulling remaining layers from the repository server, the repository server sends data of the remaining layers to the first node.

The remaining layers are layers other than the common layer in the first image.

After transmission of the common layer is completed in the pipeline stage, the non-pipeline stage starts for transmitting remaining layers of different images.

In some embodiments, after acquisition of the data of the common layer is completed, the first node sends a request for pulling remaining layers to the repository server according to the remaining layers indicated in the layer list. That is, after the acquisition of the data of the common layer is completed, the repository server receives a request for pulling remaining layers generated by the first node according to the remaining layers indicated in the layer list.

Figure 3E:
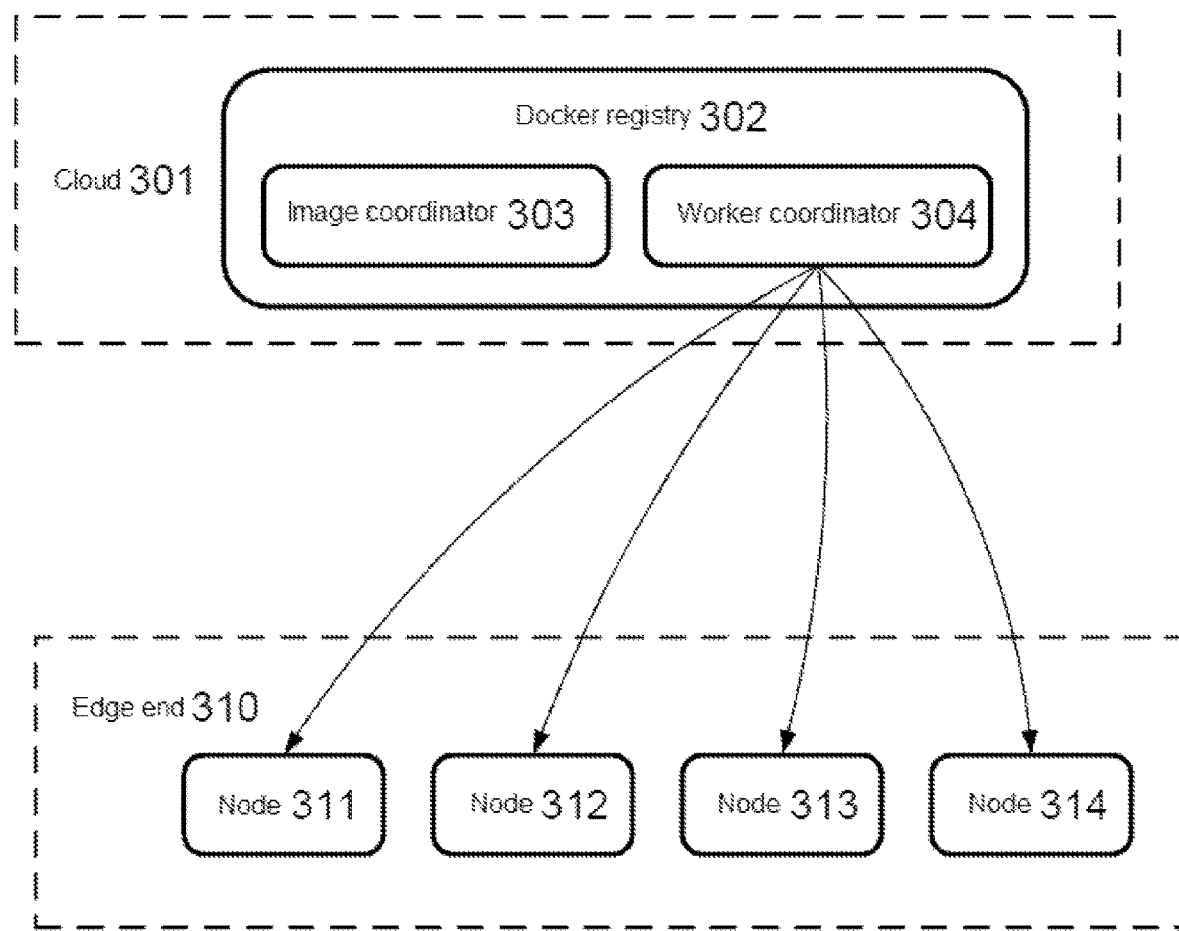
FIG. 3E is an example process of a technical solution applying image deployment according to some embodiments of the present disclosure.

With reference to the example shown in FIG. 3E, each edge node independently and concurrently requests for pulling the remaining layers of the docker image from docker registry 302. In response to receiving the request for pulling the remaining layers of the docker image, worker coordinator 304 transmits the data of the remaining layers to the corresponding edge node. Worker coordinator 304 may control a transmission rate to each node according to a preset policy. For example, worker coordinator 304 may control the transmission rate to each node, set a transmission rate to a certain edge node to be faster than those to other edge nodes, so that the edge node is preferentially deployed with the image. Embodiments of the present disclosure do not impose any limitation to the transmission method and policy of remaining layers.

After all the above steps are completed, the deployment of corresponding docker images to all nodes is completed. That is, the first node completely obtains the first image.

A method for image deployment provided in embodiments of the present disclosure aims to change the object of a request of each edge node for pulling an image and optimize the transmission path of image layers. Originally, each edge node initiates a request for pulling a required image from the repository server. When the repository server learns by analysis that the images required by a plurality of edge nodes have a common layer, the repository server may establish a pipeline for transmission of data of the common layer, and respectively inform the plurality of edge nodes that they may initiate a request for pulling the common layer to upstream nodes of their own in the pipeline, so that the transmission efficiency of the common layer is higher. For the layers other than the common layer in the required images, the plurality of edge nodes may continue to initiate requests for pulling the remaining layers to the repository server.

The transmission speed of the LAN for distributing data between edge nodes is usually faster than the transmission speed of the WAN between a cloud and an edge end, and various edge nodes are notified of corresponding layer lists and the common layer of the images before transmitting the images, so by implementing the method provided by some embodiments, the common layer of the images only needs to be transmitted from the repository server in the cloud to the edge end once, avoiding repeated pulling of the same image layer, thereby reducing the network transmission overhead, improving the image deployment efficiency, and shortening the total image deployment time.

FIG. 3A to FIG. 3E are schematic diagrams showing an example process of a technical solution applying image deployment according to the present disclosure. The example process shown in FIG. 3A to FIG. 3E will be described in detail below.

In the example of FIG. 3A to FIG. 3E, cloud 301 includes docker registry 302, and docker registry 302 is provided with image coordinator 303, worker coordinator 304, and the like. Edge nodes of edge end 310 include node 311, node 312, node 313, node 314, and the like. Docker registry 302 stores a plurality of images, and the nodes of edge end 310 may request for pulling required images from docker registry 302 of cloud 301. In this example, node 311 needs to deploy image A, and image A includes layer X1, layer X2, and layer X3. Node 312 needs to deploy image B, and image B includes layer X1, layer X4, and layer X5. Node 313 needs to deploy image C, and image C includes layer X1 and layer X6. Node 314 needs to deploy image D, and image D includes layer X1 and layer X7. As can be seen, the different images required by node 311, node 312, node 313, and node 314 have common layer X1, where layer X1 includes data block X1D1, data block X1D2, data block X1D3, and the like.

Image coordinator 303 in docker registry 302 may be configured to receive requests for pulling images from various edge nodes (or referred to as worker nodes) of edge end 310, and image coordinator 303 may also be configured to analyze layers of all images to generate a layer list. Image coordinator 303 may also be configured to generate data blocks for the same image layer transmitted in a pipeline stage. Image coordinator 303 may also be configured to send a relevant layer list and a list of data blocks of the same layer to each edge node of edge end 310.

Worker coordinator 304 may be configured to coordinate the docker image transmission agent of various edge nodes of edge end 310, and further configured to establish a transmission pipeline for the same image layer in the pipeline stage, and to coordinate the transmission of remaining image data of a non-pipeline stage. The docker image transmission agent is configured to assist the image transmission of an edge node.

The process of deploying images on edge end nodes may be divided into an image request stage, a pipeline stage, a non-pipeline stage, and the like.

Steps in the image request stage may include: Master node 315 of edge end 310 sends a parameter indicating a to-be-deployed image to each edge node, and each edge node sends an image pull request to docker registry 302 of cloud 301 according to the parameter. Image coordinator 303 in docker registry 302 receives the image pull requests from the edge nodes, and then image coordinator 303 analyzes a docker image requested by each edge node according to parameters carried by the plurality of image pull requests, and generates a layer list of a corresponding image for each edge node. If it is learned that different docker images required by different edge nodes have the same layer, the same layer may be used for generating data blocks for data transmission in the pipeline stage. Afterwards, image coordinator 303 may send a layer list corresponding to the generated image and hash values of data blocks of the same layer to each edge node.

In some embodiments, master node 315 sends a deployment script to all edge nodes, where the deployment script includes parameters such as a unique batch identifier and the number of an image to be deployed. The unique batch identifier is used for identifying different image pull request batches to avoid confusion, and the number of an image to be deployed is used for identifying which image or images needs to be deployed. In one example, the unique batch identifier may be represented by BATCH_UUID, and the number of an image to be deployed may be represented by NUM_OF_DEPLOYMENT. Master node 315 may be a separate node of edge end 310 and is used for coordinating, managing, and allocating the deployment or storage of the images of the edge nodes.

Referring to the example of FIG. 3A, master node 315 may send a deployment script to nodes 311, 312, 313, and 314, where the deployment script includes parameters such as a unique batch identifier, the number of an image to be deployed, and the like. For example, in this batch, the deployment script sent by master node 315 to node 311 indicates that node 311 needs to deploy image A, the deployment script sent by master node 315 to node 312 indicates that node 312 needs to deploy image B, the deployment script sent by master node 315 to node 313 indicates that node 313 needs to deploy image C, and the deployment script sent by master node 315 to node 314 indicates that node 314 needs to deploy image D.

Each edge node may initiate a corresponding image pull request to docker registry 302 according to the parameters of the received deployment script of master node 315, such as the unique batch identifier and the number of the image to be deployed. The image pull request carries parameters such as the unique batch identifier and the number of the image to be deployed.

Referring to the example of FIG. 3B, node 311 of edge end 310 initiates image pull request A to image coordinator 303 of docker registry 302, and image pull request A indicates that node 311 requests for acquiring image A. Node 312 initiates image pull request B to image coordinator 303 of docker registry 302, and image pull request B indicates that node 312 requests for acquiring image B. Node 313 initiates image pull request C to image coordinator 303 of docker registry 302, and image pull request C indicates that node 313 requests for acquiring image C. Node 314 initiates image pull request D to image coordinator 303 of docker registry 302, and image pull request D indicates that node 314 requests for acquiring image D.

Image coordinator 303 in docker registry 302 receives the image pull requests from various edge nodes, and then docker registry 302 may analyze layers of a docker image requested by each edge node according to the plurality of image pull requests, and generate a layer list for the image pull request of each edge node. If it is learned that different docker images have the same layer, that is, the common layer described in method 200, the same layer may be divided into a plurality of data blocks, and hash values corresponding to the plurality of data blocks are generated for use in data transmission in the pipeline stage. Then, image coordinator 303 sends the generated layer list and the hash values of the data blocks of the same layer to each edge node.

Compared with directly packaging the image layers as a data packet for transmission, dividing the same layer of the images into a plurality of data blocks for transmission and sending the hash values corresponding to the plurality of data blocks to each edge node reduces the packet loss rate and error rate of data transmission in the pipeline stage during the data transmission, such that the transmission success rate when the same layer is transmitted between the edge nodes is improved. In some other embodiments, data of the image may also be transmitted in other ways without generating data blocks, and the scope of the present disclosure is not limited in this respect.

For example, referring to the example of FIG. 3C, image coordinator 303 may learn, according to received image pull request A, image pull request B, image pull request C, and image pull request D, that node 311 in this batch requires image A, node 312 requires image B, node 313 requires image C, and node 314 requires image D, then analyze layers of image A, image B, image C, and image D to determine that image A includes layer X1, layer X2, and layer X3, image B includes layer X1, layer X4, and layer X5, the image C includes layer X1 and layer X6, and image D includes layer X1 and layer X7. Image coordinator 303 finds through analysis that image A, image B, image C, and image D have common layer X1, and layer X1 may be divided into a plurality of data blocks such as data block X1D1, data block X1D2, and data block X1D3 for transmission, and hash values of the data blocks can be generated. Then, image coordinator 303 sends a generated layer list (including layer X1, layer X2, and layer X3) and the hash values of the data blocks of layer X1 to node 311, sends a generated layer list (including layer X1, layer X4, and layer X5) and the hash values of the data blocks of layer X1 to node 312, sends a generated layer list (including layer X1 and layer X6) and the hash values of the data blocks of layer X1 to node 313, and sends a generated layer list (including layer X1 and layer X7) and the hash values of the data blocks of layer X1 to node 314.

After the image request stage, docker registry 302 of cloud 301 transmits data of the to-be-deployed image to each edge node of edge end 310, including a pipeline stage and a non-pipeline stage. The pipeline stage is used for transmitting the same image layer, and the non-pipeline stage is used for transmitting the remaining layers of different images.

Steps of the pipeline stage may include the following. Worker coordinator 304 selects an edge node as a leader node randomly or according to a preset policy. Worker coordinator 304 establishes a pipeline for data transmission for the same image layer. Worker coordinator 304 sends relevant setting information of the pipeline to each edge node, and the setting information may include an upstream node and/or a downstream node corresponding to each edge node, the layer list of the image, and the hash values of the data blocks of the same layer. After each node receives the corresponding setting information, a pipeline agent transmits the data blocks of the same image layer in parallel according to the setting information of the pipeline until the transmission is completed.

The leader node has a leading role of the edge nodes in the pipeline stage of the docker image deployment, that is, an initial node of edge end 310 that receives the data of the common layer from docker registry 302, and is used for directly pulling the same layer of the images from docker registry 302, and distributing the data of the same layer to other nodes of the same edge end 310. In this way, the same image layer only needs to be transmitted from cloud 301 to edge end 310 once, and then distributed among the edge nodes of edge end 310.

The pipeline agent is a temporary agent in the edge nodes, which is used for assisting the image data transmission of the pipeline in the pipeline stage of the docker image deployment, and its life cycle only exists in the pipeline stage.

In some embodiments, the pipeline may be optimally set according to preset policies, measurement indexes, specific requirements, or the like, for optimizing by minimizing the total transmission time or service provision time, the method of setting the pipeline and the form of the pipeline may be diversified, and different setting policies may generate different pipelines. This embodiment does not impose any limitation as to how to select the leader node, the strategy, method, and requirements for setting the pipeline, and the representation of the pipeline.

In some embodiments, the pipeline may be arranged to flow in a certain order, represented by a directed acyclic graph. In an example, referring to FIG. 3D, in the pipeline stage, node 314 is selected as the leader node, and the set pipeline for transmitting the same image layer X1 is: docker registry 302→node 314→node 313→node 312/node 311. Worker coordinator 304 sends relevant setting information of the pipeline to node 314, which may include an upstream node of node 314 being docker registry 302, a downstream node of node 314 being node 313, the layer list (including layer X1 and layer X7) of the image corresponding to node 314, and the hash values of the data blocks of layer X1. Worker coordinator 304 sends relevant setting information of the pipeline to node 313, which may include an upstream node of node 313 being node 314, downstream nodes of node 313 being node 312 and node 311, the layer list (including layer X1 and layer X6) of the image corresponding to node 313, and the hash values of the data blocks of layer X1. Worker coordinator 304 sends relevant setting information of the pipeline to node 312, which may include an upstream node of node 312 being node 313, the layer list (including layer X1, layer X4, and layer X5) of the image corresponding to node 312, and the hash values of the data blocks of layer X1. Worker coordinator 304 sends relevant setting information of the pipeline to node 311, which may include an upstream node of node 311 being node 313, the layer list (including layer X1, layer X2, and layer X3) of the image corresponding to node 311, and the hash values of the data blocks of layer X1. Each edge node may pull the data blocks of layer X1 from the upstream node according to the hash values of the data blocks of layer X1. After node 311, node 312, node 313, and node 314 receive the corresponding setting information, the pipeline agent transmits the data blocks of image layer X1 in parallel according to the setting information of the pipeline until the transmission is completed. That is, the docker registry may transmit the data blocks of layer X1 to node 314; node 313 pulls the data blocks of layer X1 from the upstream node, that is, node 314 according to the hash values of the data blocks of layer X1, and then node 314 may transmit the obtained data blocks of layer X1 to node 313; node 312 pulls the data blocks of layer X1 from the upstream node, that is, node 313 according to the hash values of the data blocks of layer X1, and then node 313 may transmit the obtained data blocks of layer X1 to node 312; node 311 pulls the data blocks of layer X1 from the upstream node, that is, node 313 according to the hash values of the data blocks of layer X1, and then node 313 may transmit the obtained data blocks of layer X1 to node 311.

After the pipeline stage finishes transmitting the same image layer, the non-pipeline stage starts to transmit remaining layers of different images. Steps in the non-pipeline stage may include the following. Each edge node independently and concurrently requests for pulling the remaining layers of the docker image from docker registry 302. In response to receiving the request for pulling the remaining layers of the docker image, worker coordinator 304 transmits the data of the remaining layers to the corresponding edge node. Worker coordinator 304 may control a transmission rate to each node according to a preset policy. For example, worker coordinator 304 may control the transmission rate to each node, and set a transmission rate to a certain edge node to be faster than those to other edge nodes, so that the edge node is preferentially deployed with the image. Embodiments of the present disclosure do not impose any limitation to the transmission method and policy of remaining layers.

Referring to the example of FIG. 3E, in the non-pipeline stage, independently and concurrently, node 311 requests for pulling data of remaining layers X2 and X3 other than layer X1 of image A from docker registry 302, node 312 requests for pulling data of remaining layers X4 and X5 other than layer X1 of image B from docker registry 302, node 313 requests for pulling data of remaining layer X6 other than layer X1 of image C from docker registry 302, and node 314 requests for pulling data of remaining layer X7 other than layer X1 of image D from docker registry 302.

After all the above stages end, all edge nodes complete the deployment of corresponding docker images. That is, node 311 obtains image A completely, node 312 obtains image B completely, node 313 obtains image C completely, and node 314 obtains image D completely.

The solution for image deployment provided in embodiments of the present disclosure aims to change the object of a request of each edge node for pulling an image and optimize the transmission path of image layers. Originally, each edge node initiates a request for pulling a required image from the repository server. When the repository server learns by analysis that the images required by a plurality of edge nodes have a common layer, the repository server may establish a pipeline for transmission of data of the common layer, and respectively inform the plurality of edge nodes that they may initiate a request for pulling the common layer to upstream nodes of their own in the pipeline, so that the transmission efficiency of the common layer is higher. For the remaining layers other than the common layer in the required images, the plurality of edge nodes may continue to initiate requests for pulling the remaining layers to the repository server.

The transmission speed of the LAN for distributing data between edge nodes is usually faster than the transmission speed of the WAN between cloud 301 and edge end 310, and various edge nodes are notified of corresponding layer lists and the same image layer before transmitting the images, so by implementing the method provided by some embodiments, the same image layer only needs to be transmitted from cloud 301 to edge end 310 once, avoiding repeated pulling of the same image layer, thereby reducing the network transmission overhead, improving the image deployment efficiency, and shortening the total image deployment time.

Figure 4:
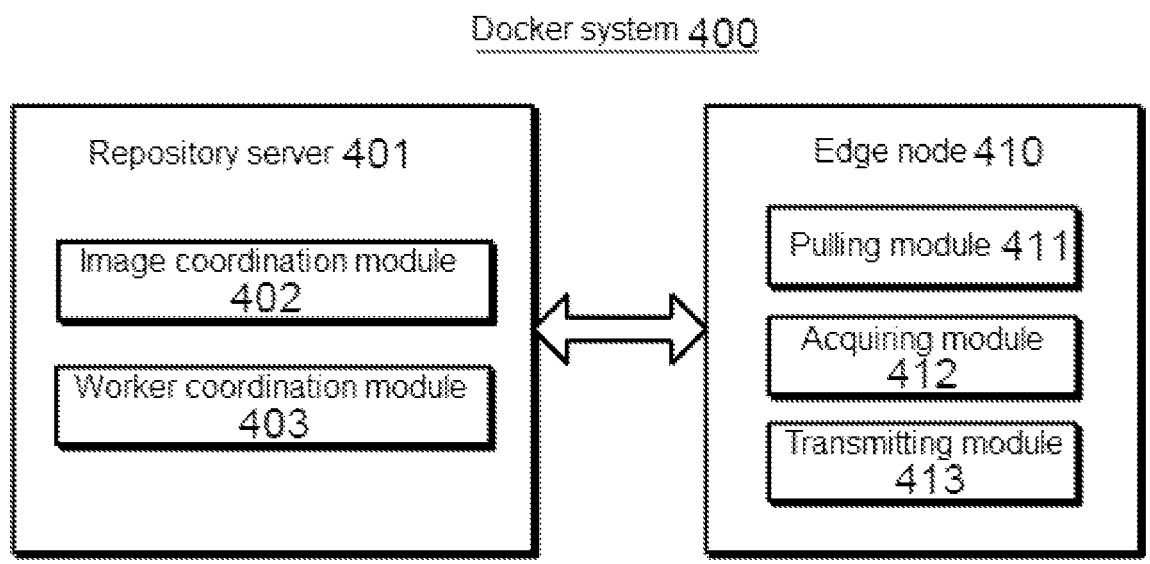
FIG. 4 is a schematic diagram of functional modules configured for image deployment according to some embodiments of the present disclosure.

FIG. 4 is a schematic diagram of functional modules of a docker system 400 configured for image deployment according to some embodiments of the present disclosure. In some embodiments of the present disclosure, docker system 400 may be divided into functional modules. For example, various functions of docker system 400 may be divided into various functional modules, or two or more functions of docker system 400 may be integrated into one functional module, which is not limited in this embodiment.

As shown in FIG. 4, docker system 400 may include repository server 401 and a plurality of edge nodes 410. In some embodiments, repository server 401 may be configured to implement the functions of the repository server described in the foregoing embodiments, and edge nodes 410 may be implemented as the functions of the described edge nodes in the foregoing embodiments, and details are not repeated here for the sake of brevity. Each functional module in docker system 400, repository server 401, and edge node 410 may be implemented by software, hardware, or a combination of the two.

As shown in FIG. 4, repository server 401 may include: image coordination module 402, worker coordination module 403, and the like.

Image coordination module 402 may be configured to receive a request from edge node 410 for pulling an image. Image coordination module 402 may also be configured to analyze layers of all images that are requested to be pulled to generate layer lists. Image coordination module 402 may also be configured to generate data blocks for a common layer of images transmitted in a pipeline stage, and image coordination module 402 may also be configured to send a relevant layer list and a data block list of the common layer to edge node 410.

It is to be understood that, for the specific implementation of each function included in image coordination module 402, reference can be made to the detailed description of the image coordinator in the foregoing embodiments, and details are not repeated here.

Worker coordination module 403 may be configured to coordinate the docker image transmission agent of edge node 410, worker coordination module 403 may be configured to select a leader node randomly or according to a pre-set policy, worker coordination module 403 may be configured to establish a transmission pipeline for a common layer of images in a pipeline stage, and worker coordination module 403 may be configured to coordinate transmission of data of remaining images in a non-pipeline stage, and the like. Worker coordination module 403 may also be configured to send relevant setting information of the pipeline to edge node 410, where the setting information may include an upstream node and/or a downstream node corresponding to edge node 410, a layer list of a required image, and hash values of data blocks of the common layer. Worker coordination module 403 may also be configured to control the transmission rate of transmitting data to edge node 410.

It is to be understood that, for the specific implementation of each function included in worker coordination module 403, reference may be made to the detailed description of the worker coordinator in the foregoing embodiments, and details are not repeated here.

As shown in FIG. 4, edge node 410 may include: pulling module 411, acquiring module 412, transmitting module 413, and the like.

Pulling module 411 may be configured to request for pulling a required image from repository server 401. Pulling module 411 may also be configured to request for pulling data of a common layer from an upstream node according to setting information. Pulling module 411 may also be configured to request for pulling remaining layers other than a common layer of the required image from repository server 401 according to a layer list.

Acquiring module 412 may be configured to receive a parameter sent by a master node indicating a to-be-deployed image, and acquiring module 412 may also be configured to acquire setting information related to a pipeline sent by repository server 401.

Transmitting module 413 may be configured to transmit data of the common layer to a downstream node in the pipeline.

It is to be understood that for the specific implementation of the functions included in pulling module 411, acquiring module 412, and transmitting module 413 of edge node 410, reference may be made to the detailed descriptions in the foregoing embodiments, and details are not repeated here.

The modules and/or units shown in FIG. 4 may be implemented in part or in whole as hardware modules, software modules, firmware modules, or any combination thereof. In particular, in some embodiments, the procedures, methods, or processes described above may be implemented by hardware in a storage system or a host corresponding to the storage system or other computing devices independent of the storage system.

Figure 5:
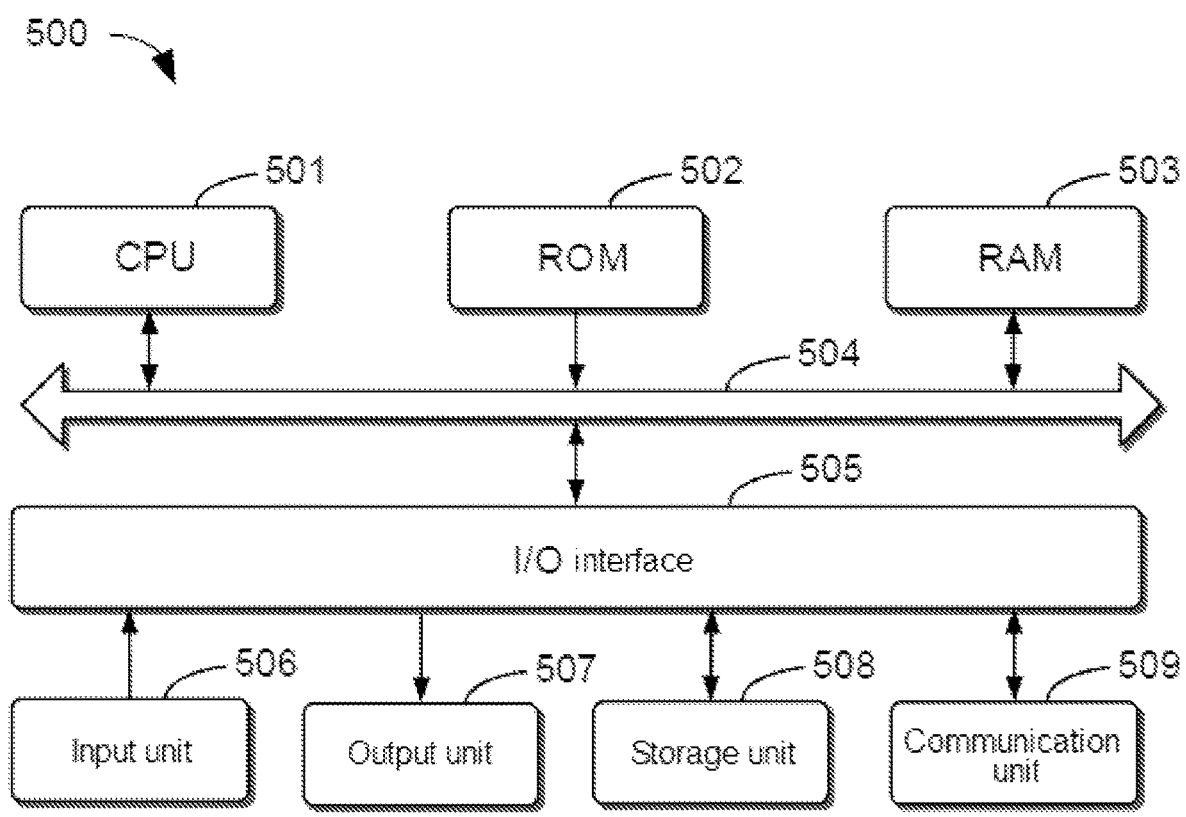
FIG. 5 is a schematic structural diagram of a device that can be configured to implement embodiments of the present disclosure.

FIG. 5 is a schematic structural diagram of an example device 500 that can be configured to implement some embodiments of the present disclosure. Device 500 may be configured to implement the above edge node or repository server. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

CPU 501 may execute the various methods and/or processing described above, such as method 200. For example, in some embodiments, method 200 may be implemented as a computer software program that is tangibly contained in a machine-readable medium, such as storage unit 508. In some embodiments, part of or all the computer program may be loaded and/or installed to device 500 via ROM 502 and/or communication unit 509. When the computer program is loaded onto RAM 503 and executed by CPU 501, one or more steps of method 200 described above may be performed. Alternatively, in other embodiments, CPU 501 may be configured to perform method 200 in any other suitable manners (e.g., by means of firmware).

The functions described herein may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code can be completely executed on a machine, partially executed on a machine, partially executed on a machine as an independent software package and partially executed on a remote machine, or completely executed on a remote machine or a server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or the technical improvements to technologies on the market, so as to enable persons of ordinary skill in the art to understand the embodiments disclosed herein.

What is claimed is:

1. A method for image deployment, comprising:
receiving requests for pulling images from a plurality of nodes, wherein an image requested to be pulled by a first node is a first image;
detecting that layers of a plurality of images requested to be pulled by the plurality of nodes all comprise a common layer;
generating a transmission path of data of the common layer, wherein the transmission path comprises transmitting the data of the common layer to a second node, the second node being an initial node selected in the plurality of nodes for distributing the data of the common layer to other nodes;
sending setting information to the first node according to the transmission path, wherein the setting information comprises instructing the first node to acquire the data of the common layer from a third node that acquires at least portions of the data of the common layer from the second node based on the transmission path, the transmission path specifying a data transmission pipeline for transmitting at least portions of the data of the common layer (i) from at least one server to the second node, (ii) from the second node to the third node and (iii) from the third node to the first node; and
sending the data of the common layer to the second node, wherein the first node acquires the data of the common layer from the third node according to the setting information;
wherein the plurality of nodes comprise respective edge nodes of a cloud-edge architecture;
wherein the server comprises a cloud-based container registry of the cloud-edge architecture, the cloud-based container registry comprising a worker coordinator component;
wherein the worker coordinator component is configured to communicate with a plurality of pipeline agents implemented in respective ones of the edge nodes; and
wherein each of the pipeline agents receives at least portions of the setting information from the worker coordinator component, the pipeline agents collectively implementing the data transmission pipeline based on the received setting information.

2. The method according to claim 1, further comprising:
sending, in response to a request of the first node for pulling remaining layers, data of the remaining layers to the first node, wherein the remaining layers are layers other than the common layer in the first image.

3. The method according to claim 2, further comprising:
generating a layer list of the first image according to layers comprised in the first image, wherein the layer list comprises the common layer; and
sending the layer list of the first image to the first node.

4. The method according to claim 3, wherein the layer list further comprises the remaining layers, and the method further comprises:
receiving, after acquisition of the data of the common layer is completed, a request for pulling the remaining layers that is generated by the first node according to the remaining layers indicated in the layer list.

5. The method according to claim 1, wherein the received request of the first node for pulling the first image is generated according to deployment parameters sent by a fourth node, the deployment parameters comprise a parameter identifying a to-be-deployed image of the first node as the first image, and the fourth node is configured to arrange to-be-deployed images of the plurality of nodes.

6. The method according to claim 1, wherein the transmission path is a directed acyclic graph.

7. The method according to claim 1, further comprising:
dividing the common layer into a plurality of data blocks, each data block in the plurality of data blocks corresponding to a hash value, wherein the setting information sent to the first node further comprises hash values corresponding to the plurality of data blocks; and
the acquiring, by the first node, the data of the common layer from the third node according to the setting information comprises:
acquiring, by the first node, the plurality of data blocks constituting the common layer from the third node according to the hash values corresponding to the plurality of data blocks.

8. A server, comprising:
at least one processor; and
a memory coupled to the at least one processor, wherein the memory has instructions stored therein, and the instructions, when executed by the at least one processor, cause the server to perform actions comprising:
receiving requests for pulling images from a plurality of nodes, wherein an image requested to be pulled by a first node is a first image;

detecting that layers of a plurality of images requested to be pulled by the plurality of nodes all comprise a common layer;

generating a transmission path of data of the common layer, wherein the transmission path comprises transmitting the data of the common layer to a second node, the second node being an initial node selected in the plurality of nodes for distributing the data of the common layer to other nodes;

sending setting information to the first node according to the transmission path, wherein the setting information comprises instructing the first node to acquire the data of the common layer from a third node that acquires at least portions of the data of the common layer from the second node based on the transmission path, the transmission path specifying a data transmission pipeline for transmitting at least portions of the data of the common layer (i) from the server to the second node, (ii) from the second node to the third node and (iii) from the third node to the first node; and sending the data of the common layer to the second node, wherein the first node acquires the data of the common layer from the third node according to the setting information;

wherein the plurality of nodes comprise respective edge nodes of a cloud-edge architecture;

wherein the server comprises a cloud-based container registry of the cloud-edge architecture, the cloud-based container registry comprising a worker coordinator component;

wherein the worker coordinator component is configured to communicate with a plurality of pipeline agents implemented in respective ones of the edge nodes; and wherein each of the pipeline agents receives at least portions of the setting information from the worker coordinator component, the pipeline agents collectively implementing the data transmission pipeline based on the received setting information.

9. The server according to claim 8, wherein the actions further comprise:
sending, in response to a request of the first node for pulling remaining layers, data of the remaining layers to the first node, wherein the remaining layers are layers other than the common layer in the first image.

10. The server according to claim 9, wherein the actions further comprise:
generating a layer list of the first image according to layers comprised in the first image, wherein the layer list comprises the common layer; and
sending the layer list of the first image to the first node.

11. The server according to claim 10, wherein the layer list further comprises the remaining layers, and the actions further comprise:
receiving, after acquisition of the data of the common layer is completed, a request for pulling the remaining layers that is generated by the first node according to the remaining layers indicated in the layer list.

12. The server according to claim 8, wherein the received request of the first node for pulling the first image is generated according to deployment parameters sent by a fourth node, the deployment parameters comprise a parameter identifying a to-be-deployed image of the first node as the first image, and the fourth node is configured to arrange to-be-deployed images of the plurality of nodes.

13. The server according to claim 8, wherein the transmission path is a directed acyclic graph.

14. The server according to claim 8, wherein the actions further comprise:
dividing the common layer into a plurality of data blocks, each data block in the plurality of data blocks corresponding to a hash value, wherein the setting information sent to the first node further comprises hash values corresponding to the plurality of data blocks; and
the acquiring, by the first node, the data of the common layer from the third node according to the setting information comprises:
acquiring, by the first node, the plurality of data blocks constituting the common layer from the third node according to the hash values corresponding to the plurality of data blocks.

15. A computer program product that is tangibly stored on a non-transitory computer-readable medium and comprises machine-executable instructions, wherein the machine-executable instructions, when executed by a machine, cause the machine to perform a method for image deployment, the method comprising:

receiving requests for pulling images from a plurality of nodes, wherein an image requested to be pulled by a first node is a first image;

detecting that layers of a plurality of images requested to be pulled by the plurality of nodes all comprise a common layer;

generating a transmission path of data of the common layer, wherein the transmission path comprises transmitting the data of the common layer to a second node, the second node being an initial node selected in the plurality of nodes for distributing the data of the common layer to other nodes;

sending setting information to the first node according to the transmission path, wherein the setting information comprises instructing the first node to acquire the data of the common layer from a third node that acquires at least portions of the data of the common layer from the second node based on the transmission path, the transmission path specifying a data transmission pipeline for transmitting at least portions of the data of the common layer (i) from at least one server to the second node, (ii) from the second node to the third node and (iii) from the third node to the first node; and sending the data of the common layer to the second node, wherein the first node acquires the data of the common layer from the third node according to the setting information;

wherein the plurality of nodes comprise respective edge nodes of a cloud-edge architecture;

wherein the at least one server comprises a cloud-based container registry of the cloud-edge architecture, the cloud-based container registry comprising a worker coordinator component;

wherein the worker coordinator component is configured to communicate with a plurality of pipeline agents implemented in respective ones of the edge nodes; and wherein each of the pipeline agents receives at least portions of the setting information from the worker coordinator component, the pipeline agents collectively implementing the data transmission pipeline based on the received setting information.

16. The computer program product according to claim 15, wherein the method further comprises:
sending, in response to a request of the first node for pulling remaining layers, data of the remaining layers to the first node, wherein the remaining layers are layers other than the common layer in the first image.

17. The computer program product according to claim 16, wherein the method further comprises:
- generating a layer list of the first image according to layers comprised in the first image, wherein the layer list comprises the common layer; and
- sending the layer list of the first image to the first node.

18. The computer program product according to claim 17, wherein the layer list further comprises the remaining layers, and the method further comprises:
- receiving, after acquisition of the data of the common layer is completed, a request for pulling the remaining layers that is generated by the first node according to the remaining layers indicated in the layer list.

19. The computer program product according to claim 15, wherein the received request of the first node for pulling the first image is generated according to deployment parameters sent by a fourth node, the deployment parameters comprise a parameter identifying a to-be-deployed image of the first node as the first image, and the fourth node is configured to arrange to-be-deployed images of the plurality of nodes.

20. The computer program product according to claim 15, wherein the transmission path is a directed acyclic graph.

* * * * *